United States Patent
Chan

(10) Patent No.: US 10,396,580 B2
(45) Date of Patent: *Aug. 27, 2019

(54) METHOD AND APPARATUS FOR INTELLIGENT BATTERY CONTROL

(71) Applicant: AT&T Intellectual Property I, L.P., Atlanta, GA (US)

(72) Inventor: Jesse Chan, Bothell, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,065

(22) Filed: Jan. 5, 2018

(65) Prior Publication Data
US 2018/0131215 A1    May 10, 2018

Related U.S. Application Data

(63) Continuation of application No. 14/808,525, filed on Jul. 24, 2015, now Pat. No. 9,893,544.

(51) Int. Cl.
| | |
|---|---|
| *H02J 3/46* | (2006.01) |
| *H02J 7/00* | (2006.01) |
| *H02J 7/34* | (2006.01) |
| *H02J 7/35* | (2006.01) |

(52) U.S. Cl.
CPC .......... *H02J 7/0068* (2013.01); *H02J 7/0055* (2013.01); *H02J 7/345* (2013.01); *H02J 7/35* (2013.01); *H02J 2007/0067* (2013.01)

(58) Field of Classification Search
CPC ............... Y02B 60/50; H05B 37/0227; H05B 37/0272; H04W 52/0296
See application file for complete search history.

(56) References Cited

U.S. PATENT DOCUMENTS

| | | |
|---|---|---|
| 5,889,388 A | 3/1999 | Cameron et al. |
| 6,433,508 B1 | 8/2002 | Yang |
| 6,507,169 B1 | 1/2003 | Holtom et al. |
| 6,628,107 B1 | 9/2003 | Bang et al. |
| 6,914,411 B2 | 7/2005 | Couch et al. |
| 7,500,114 B2 | 3/2009 | Oh et al. |
| 8,406,824 B2 | 3/2013 | Taniuchi et al. |
| 8,511,576 B2 | 8/2013 | Warren et al. |
| 8,614,595 B2 | 12/2013 | Acatrinei |
| 8,655,574 B2 | 2/2014 | Izumoto et al. |
| 9,018,794 B2 | 4/2015 | Okabe et al. |
| 2003/0098679 A1 | 5/2003 | Odaohhara |
| 2006/0038758 A1* | 2/2006 | Routley ............... G09G 3/3233 345/81 |
| 2006/0097575 A1* | 5/2006 | Xu ........................ B60L 11/005 307/9.1 |
| 2007/0201894 A1 | 8/2007 | Kishi et al. |
| 2010/0301799 A1* | 12/2010 | Lin ..................... H01M 10/465 320/101 |
| 2012/0223670 A1 | 9/2012 | Kinjo et al. |
| 2014/0103883 A1 | 4/2014 | Mitsutani |

* cited by examiner

*Primary Examiner* — Sibin Chen
(74) *Attorney, Agent, or Firm* — Chiesa Shahinian & Giantomasi PC

(57) ABSTRACT

A power control and delivery system for improving and prolonging the performance of batteries through a total power source comprised of a battery, a power controller and a power buffer.

20 Claims, 4 Drawing Sheets

METHOD AND APPARATUS FOR INTELLIGENT BATTERY CONTROL

This application is a continuation of prior U.S. patent application Ser. No. 14/808,525, filed Jul. 24, 2015, which is herein incorporated by reference in its entirety.

TECHNICAL FIELD

The present invention relates generally to energy storage systems and, more particularly, to a power control and delivery system for improving and prolonging the performance of batteries.

BACKGROUND OF THE INVENTION

In today's society, people are becoming more and more reliant on devices and equipment that require battery power for longer and continuous operation. For example, portable electronic devices such as smartphones, notebook computers, tablets, e-readers, smart watches and Internet of Things (IoT) are pervasive and users increasingly rely on such devices to stay constantly connected both professionally and casually for a wide variety of applications and computing purposes. In addition to portable electronic devices, the introduction and manufacture of battery operated (partially or fully) automobiles is further increasing the demands on and challenges to battery technology. Of course, critical to the operation of such electronic devices or automobiles is the delivery of power from the resident battery. As such, the electronic, automobile and battery industries have been under increased pressure to improve overall battery delivery and management technology to match the increasing needs of consumers for more continuous power levels and/or longer battery life.

For example, most currently available smartphones are designed to operate continuously for approximately 8-10 hours/day on a fully charged battery with their resident batteries (e.g., lithium-ion, nickel-metal hydride or nickel-cadmium batteries) having approximately 500 charging cycles (i.e., battery lifespan). However, in practical terms, users find that most electronic devices cannot operate over an entire day of operation on the capacity of a single battery charge and are more frequently charging such devices throughout their day.

However, incremental charging or frequent longer term charging applied to a battery will typically have a deleterious impact on the battery's lifespan and significantly diminish their operating life due to the limited (i.e., fixed) number of available battery charging cycles for the battery. Further, as a battery ages and approaches its charging cycle limit, the battery's capacity to hold energy is significantly diminished per charging cycle. For example, it is not uncommon for batteries to retain only 80% of their original charge capacity after several hundred charging cycles. The challenges to improve the delivery of available battery power and increase battery lifespan include battery size constraints, weight constraints and battery material limitations, to name just a few of the major challenges.

BRIEF SUMMARY OF THE EMBODIMENTS

In accordance with various embodiments, a power control and delivery system is provided for improving and prolonging the performance of batteries through a power source comprised of a battery, a power controller and a power buffer.

More particularly, in accordance with an embodiment, a power controller receives incoming (i.e., source) power from one or more power sources (e.g., electrical outlet, USB port, solar power, ambient backscatter, etc.) and coordinates substantially all power input and output of the device and/or apparatus to which the power controller (and total power source) is associated. The power controller intelligently, and in real-time, decides how and whether to use the incoming source power to charge the battery, the power buffer, or both. Illustratively, the power buffer is a high-capacity capacitor which has a larger set of charging cycles as compared to the battery which has a smaller set of charging cycles. As such, this difference in charging cycle footprint between the power buffer and battery can be utilized by the power controller in the delivery of power control and power output.

For example, in accordance with an embodiment, given the operating characteristics between the battery and the power buffer, the power controller effectively utilizes the power buffer to satisfy output power needs related to all or substantially all short duration or high volume power needs of a power consuming body (e.g., electronic device). In this way, the duration that a user can operate the device on a single battery charge is increased as well as prolonging the battery lifespan to maintain a maximum charge. That is, the battery, from a power and charging perspective, is more sparingly utilized by the power controller in terms of providing output power and for more prolonged device usage the power buffer is depleted before the battery is required to deliver any output power.

In accordance with an embodiment, the power controller will assess the type (or types) of the source power and determine when to provide such source power to the battery, the power buffer, or both. That is, the power controller can predict a likelihood of whether the source power will be continuous or intermittent in nature and, based on that prediction, intelligently decide how to charge the battery and/or power buffer.

DETAILED DESCRIPTION

In accordance with various embodiments, a power control and delivery system is provided for improving and prolonging the performance of batteries through a power source comprised of a battery, a power controller and a power buffer.

Figure 1:
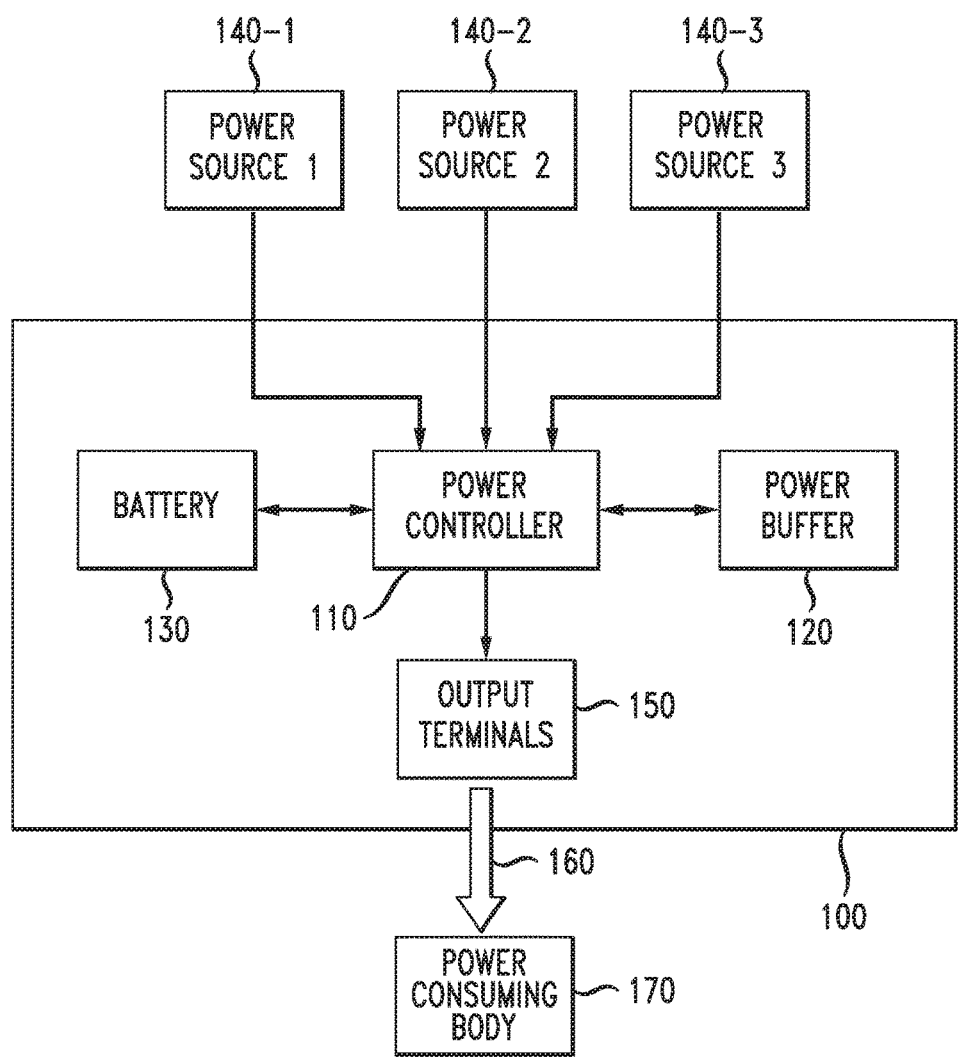
FIG. 1 shows a high-level block diagram of a power control and delivery system in accordance with an illustrative embodiment.

FIG. 1 shows a high-level block diagram of a power control and delivery system 100 in accordance with an illustrative embodiment. More particularly, in accordance with an embodiment, power controller 110 receives incoming (i.e., source) power from one or more power sources, illustratively, three (3) such power sources 140-1, 140-2 and 140-3 are shown. Power sources 140-1 through 140-3 can be any type of source power such as an electrical outlet, USB port, solar power, kinetic power, or ambient backscatter, to name just a few.

Power controller 110 is connected to battery 130 and power buffer 120 which together define a single power source in accordance with the embodiment for powering power consuming body 170, for example, a portable electronic device. As such, power controller 110 coordinates substantially all power input and output of the device and/or apparatus to which the power controller (and total power source) is associated. Power controller 110 intelligently, and in real-time, decides how and whether to use the incoming source power (i.e., power sources 140-1 through 140-3) to charge battery 130, power buffer 120, or both in a substantially contemporaneous fashion. In essence, power controller 110 serves as a power hub and intelligently distributes power based on real-time analysis of power demands from power consuming body 170.

Illustratively, power buffer 120 is a high-capacity capacitor which has a larger set of charging cycles as compared to battery 130 which has a smaller set of charging cycles. For example, power buffer 120 can be a high-capacity capacitor with $1 \times 10^6$ (1,000,000) charging cycles and battery 130 can be a lithium-ion battery with $5 \times 10^2$ (500) charging cycles. A full charging cycle is defined by the cycle to charge a power source from zero to 100%. Typically, partial charging cycles are applied which may prematurely wear the life span and/or capacity of the battery. As such, this difference in charging cycle footprint between power buffer 120 and battery 130 can be utilized by power controller 110 in delivering power control and power output (e.g., output power 160) to power consuming body 170. That is, with power buffer 120 acting as a buffer which is constantly, incrementally charging and used by the power consuming body 170, the charging cycles of battery 130 are used less and often minimized which prolongs overall battery life.

For example, in accordance with an embodiment, given the operating characteristics between battery 130 and power buffer 120, power controller 110 effectively utilizes power buffer 120 to satisfy output power needs related to all or substantially all short duration or high volume power needs of power consuming body 170. In this way, the duration that a user can operate the device on a single battery charge is increased as well as prolonging the battery lifespan to maintain a maximum charge. For example, as will be understood, a typical smartphone user will make numerous, short duration glances at their smartphone to look rapidly at incoming messages or other real-time indications, for example. In terms of power management, these glances can "sip" energy from the smartphone's battery which impacts the battery's lifespan given the need to recharge the battery as it drains from normal operation. In accordance with the embodiment, power controller 110 will intelligently charge power buffer 120 on an incremental basis, using incoming source power from power source 140-1, for example, and provide the requisite output power 160 to satisfy such energy "sips" from power buffer 120 during a first time interval without any (or minimal) power supplied by battery 130 during a second time interval. As will be understood, power controller 110 will release output power from power buffer 120 and/or battery 130 by sending a respective control signal to each when power is required. Therefore, battery 130, from a power and charging perspective, is more sparingly utilized by power controller 110 in terms of providing output power 160 and for more prolonged device usage power buffer 120 is depleted before battery 130 is required to deliver the requisite output power 160 through output terminals 150 in well-known fashion.

In accordance with an embodiment, power controller 110 will assess the type (or types) of the source power(s) and determine when to provide such source power to battery 130, power buffer 120, or both. That is, power controller 110 can predict a likelihood of whether the incoming source power will be continuous or intermittent in nature and, based on that prediction, intelligently decide how to charge battery 130 and/or power buffer 120. Power controller 110 can have a mixture of intelligence realized by one or more algorithms that can be implemented in any number of well-known ways (e.g., software, firmware, etc.). Such programmed intelligence can make predictions and take actions based on a variety of factors including, but not limited to, previous history (e.g., a pattern of overnight charging by the user), time of day, current input power sources (e.g., number and type), sustainability of the power sources (i.e., is the voltage source a sustainable source such as a standard electrical outlet or USB port, or is the voltage source a variable voltage source such as solar power or an alternate power source), and/or analyzing the charge percentage of battery 130 and/or power buffer 120.

For example, if power controller 110 makes an assessment that power source 140-1 is an electrical outlet and predicts that the source power from power source 140-1 is substantially continuous in nature, power controller 110 can effectively manage the distribution of the incoming source power between battery 130 and power buffer 120 given this continuity and the extended time that such source power will be made available. For example, if power controller 110 intelligently determines that the input power source is a continuous and sustained power source and the previous charging history indicates a very late evening (e.g., midnight) timeframe the power controller 110 can control and direct charging of battery 130 when power consuming device 170 is plugged into such electrical outlet at that designated time.

In contrast, if power controller 110 assesses that power source 140-1 is solar power and predicts that the source power from power source 140-1 is substantially intermittent (e.g., due to weather conditions) in nature, power controller 110 can effectively manage the distribution of this incoming source power between battery 130 and power buffer 120 given the discontinuity and the more abbreviated time that such intermittent source power will be made available. For example, when there is such a variable voltage source, power controller 110 may charge power buffer 120 first (i.e., a higher priority) and then determine whether to charge battery 130 at all, for example, as a function of the battery charge percentage of battery 130 at that time.

The following illustrative implementation of the above-described power control and delivery system will further the understanding and benefits of the overall battery management delivered by power control and delivery system 100. Illustratively, if power buffer 120 is a high-capacity capacitor with a 3 minute (0.05 hour) usage capacity and is paired with battery 130 having a 10 hour usage capacity, the battery usage and control from power control and delivery system 100 can be approximated as follows:

Scenario: (i) user(s) spend "x" glances/day (where a glance<3 min); and (ii) "y" hours prolonged use/day, with at least 4 hours of prolonged use.

Formulas:

Days without Buffer=[(4 Hrs. Prolonged Use+Glance Hrs.)/1 Day]=[10Hrs./$x$ Days], and solve for $x$; and  (1)

Days with Buffer=[(4 Hrs. Prolonged Use)/1 Day]= [10 Hrs./$x$ Days], and solve for $x$.  (2)

Scenario Results:

TABLE 1

| Glances Hrs. Hours Use/Day | Prolonged Use Hours Use/Day | Days w/o Buffer | Days w/Buffer |
|---|---|---|---|
| 1 hrs. | 8 hrs. | 1.11 | 1.25 |
| 2 hrs. | 8 hrs. | 1.00 | 1.25 |
| 3 hrs. | 8 hrs. | 0.91 | 1.25 |
| 4 hrs. | 8 hrs. | 0.83 | 1.25 |
| 5 hrs. | 8 hrs. | 0.77 | 1.25 |
| 6 hrs. | 8 hrs. | 0.71 | 1.25 |
| 1 hrs. | 4 hrs. | 2.00 | 2.50 |
| 2 hrs. | 4 hrs. | 1.67 | 2.50 |
| 3 hrs. | 4 hrs. | 1.43 | 2.50 |
| 4 hrs. | 4 hrs. | 1.25 | 2.50 |
| 5 hrs. | 4 hrs. | 1.11 | 2.50 |
| 6 hrs. | 4 hrs. | 1.00 | 2.50 |
| 1 hrs. | 2 hrs. | 3.33 | 5.00 |
| 2 hrs. | 2 hrs. | 2.50 | 5.00 |
| 3 hrs. | 2 hrs. | 2.00 | 5.00 |
| 4 hrs. | 2 hrs. | 1.67 | 5.00 |
| 5 hrs. | 2 hrs. | 1.43 | 5.00 |
| 6 hrs. | 2 hrs. | 1.25 | 5.00 |
| 1 hrs. | 1 hrs. | 5.00 | 10.00 |
| 2 hrs. | 1 hrs. | 3.33 | 10.00 |
| 3 hrs. | 1 hrs. | 2.50 | 10.00 |
| 4 hrs. | 1 hrs. | 2.00 | 10.00 |
| 5 hrs. | 1 hrs. | 1.67 | 10.00 |
| 6 hrs. | 1 hrs. | 1.43 | 10.00 |

As shown above in Table 1, the more glances compared to sustained power needed by a power consuming body, the more beneficial the embodiments can be to prolong overall usage on a single battery charge where glances are continuously powered by a replenished power buffering unit (e.g., power buffer 120) via various power sources (e.g., power sources 140-1 through 140-3). Further, power control and delivery system 100 can be implemented in any number of configurations where power controller 110, power buffer 120, and battery 130 are separate components (e.g., as depicted in FIG. 2) and/or where power buffer 120 and battery 130 are combined and power controller 110 is separate, and/or where power controller 110, power buffer 120, and battery 130 are all integrated together into a single profile.

Figure 2:
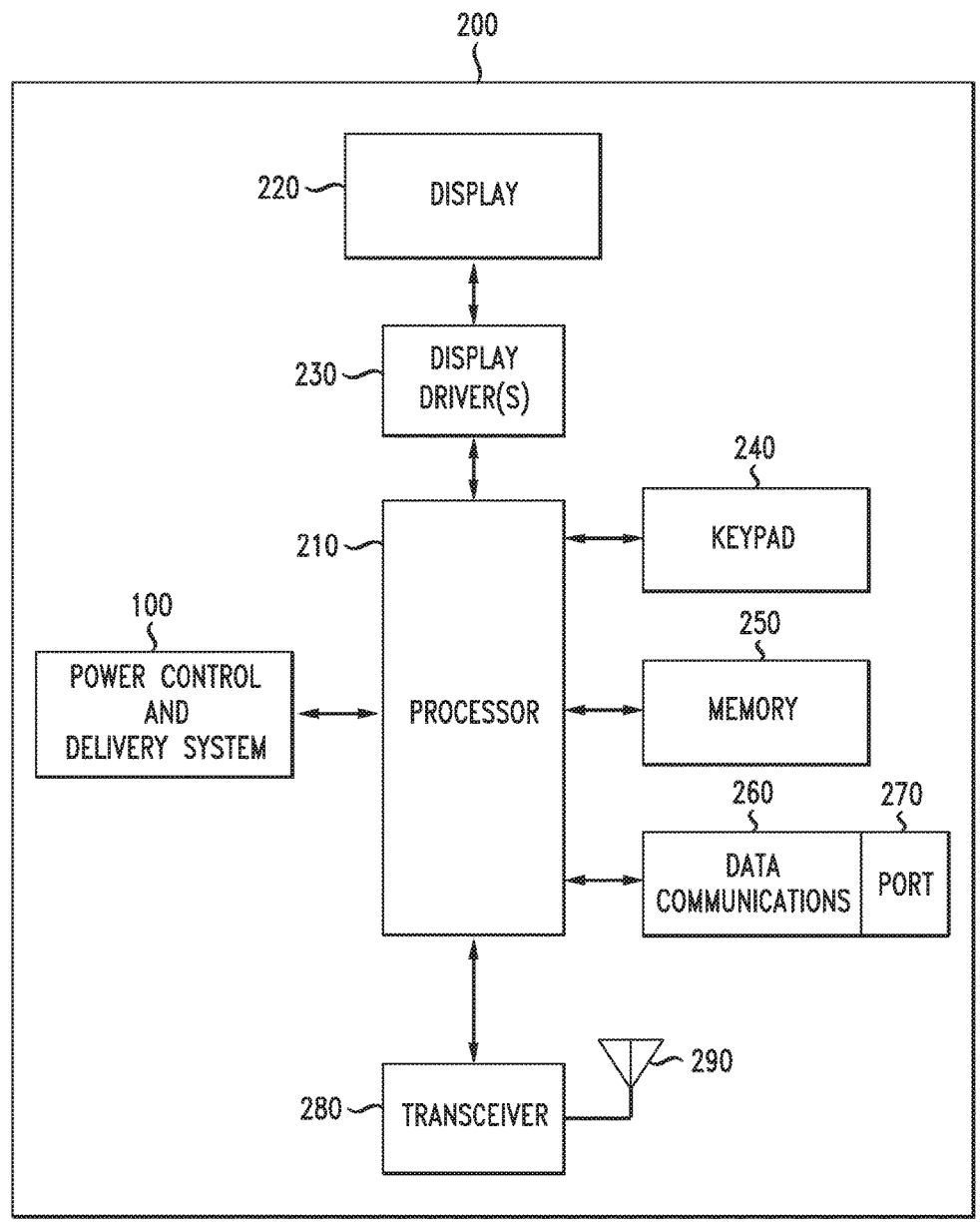
FIG. 2 shows a high-level block diagram of a portable electronic device configured in accordance with an illustrative embodiment.

Turning now to FIG. 2, a high-level block diagram of a portable electronic device 200, an illustrative power consuming body, configured in accordance with an illustrative embodiment is shown. In particular, processor 210 controls the generation operations of portable electronic device 200 and is interfaced with power control and delivery system 100 (see, FIG. 1) which powers portable electronic device 200 and performs the power control and delivery to portable electronic device 200 as detailed herein above. As will be appreciated, the scope of the embodiments herein are intended to include any device, apparatus, equipment, vehicle or other hardware that utilize battery power. Processor 210 may be programmed to carry out these functions in a well-known manner readily apparent to those having ordinary skill in the art. Memory 250 is connected with processor 210 and serves to store, among other things, program code executed by processor 210 to carry out the operating functions of portable electronic device 200.

Display 220 is coupled to processor 210 via display driver(s) 230 and display 220 may be any type of display suitable for a portable device application such as a liquid crystal display (LCD) or organic light emitting diode (OLED) display. Display 220 is operable to display data and/or other information relating to the ordinary operations of portable electronic device 200. For example, display 220 may show a set of instant messages to a user which are communicated over a wireless communications network (not shown) in a well-known fashion such communications facilitated by transceiver 280 and antenna 290. Display 220 may be a touch screen display or portable electronic device may be optionally configured to include a physical or soft keypad (e.g., keypad 240). Communications from or to portable electronic device 200 are further enabled by data communications subsystem 260 and communications port 270.

Figure 3:
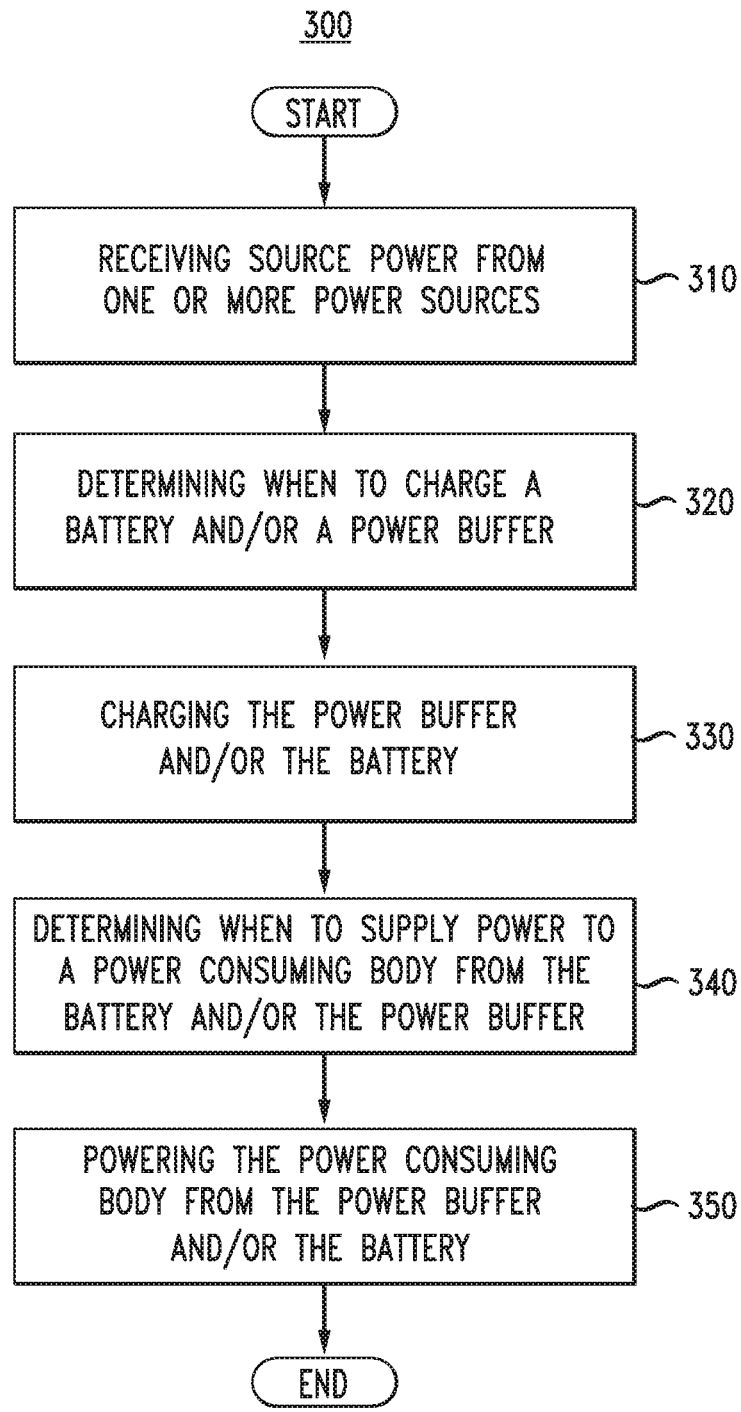
FIG. 3 shows a flowchart of illustrative operations for power control and delivery in accordance with an embodiment.

FIG. 3 shows a flowchart of illustrative operations 300 for power control and delivery in accordance with an embodiment. In accordance with the operations of FIG. 3, at step 310, source power is received from one or more power sources, illustratively, by the power controller as detailed above. In turn, the power controller, at step 320, determines (intelligently and in real-time) how and whether to use the incoming source power to charge a battery, a power buffer, or both simultaneously, and charging the power buffer and/or the battery at step 330. In accordance with embodiments described herein above, the power buffer is a high-capacity capacitor which has a larger set of charging cycles as compared to the battery which has a smaller set of charging cycles. This difference in charging cycle footprint between the power buffer and battery can be utilized by the power controller in delivery power control and power output, as detailed above.

As such, at step 340, the power controller will determine (intelligently and in real-time) when and how to supply power to a power consuming body from the battery, the power buffer, or both simultaneously, and powering the power consuming body, at step 350, from the power buffer and/or the battery accordingly. In accordance with an embodiment, power controller 110 will assess the type (or types) of the source power(s) (e.g., power sources 140-1 through 140-3) and determine when to provide such source power to battery 130, power buffer 120 or both. That is, power controller 110 will predict a likelihood of whether the source power (e.g., power source 140-1) will be continuous or intermittent in nature and, based on that prediction, intelligently decide how to charge battery 130 and/or power buffer 120. For example, if power controller 110 makes an assessment that power source 140-1 is an electrical outlet and predicts that the source power from power source 140-1 is substantially continuous in nature, power controller 110 can effectively manage the distribution of the incoming source power between battery 130 and power buffer 120 given the continuity and the extended time that such source power will be made available. In contrast, if power controller 110 determines that power source 140-2 is solar power and predicts that the source power from power source 140-2 is substantially intermittent (e.g., due to weather conditions) in nature, power controller 110 can effectively manage the distribution of the incoming source power between battery 130 and power buffer 120 given the discontinuity and the more abbreviated time that such intermittent source power will be made available.

Figure 4:
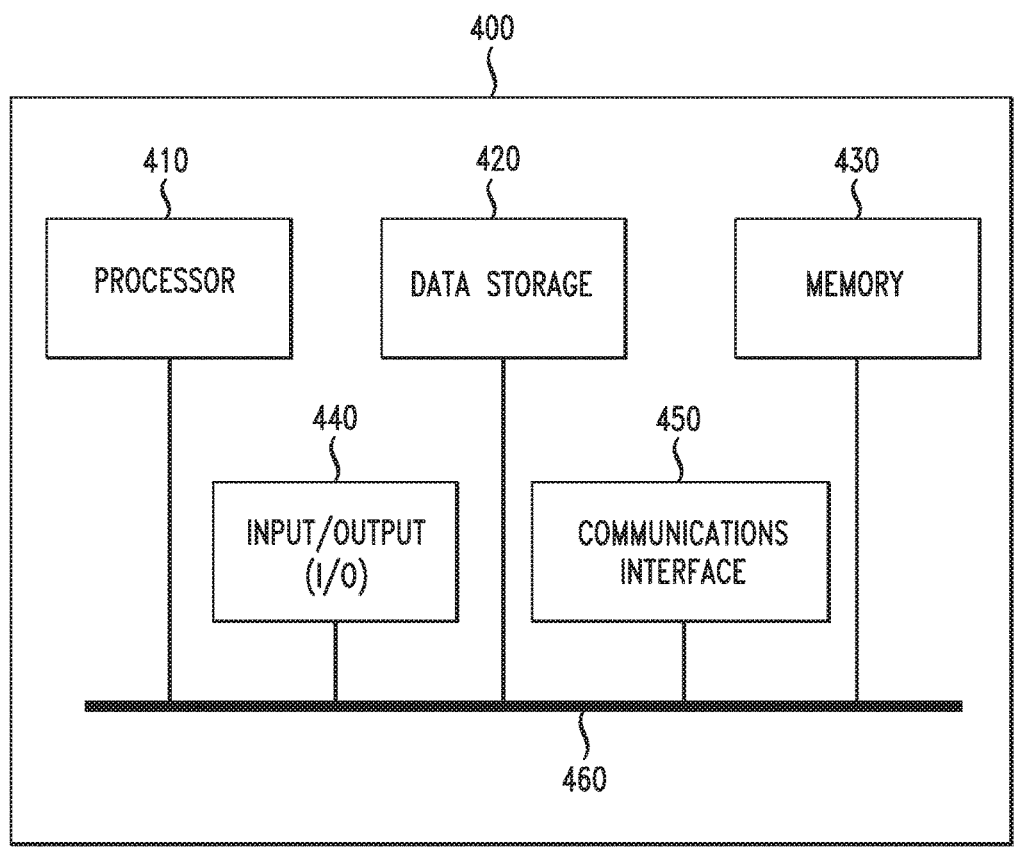
FIG. 4 is a high-level block diagram of an exemplary computer in accordance with an embodiment.

As detailed above, the various embodiments herein can be embodied in the form of methods and apparatuses for practicing those methods. The disclosed methods may be performed by a combination of hardware, software, firmware, middleware, and computer-readable medium (collectively "computer") installed in and/or communicatively connected to a processor or the like. FIG. 4 is a high-level block diagram of an exemplary computer 400 that may be used for implementing a method for power control and delivery in accordance with the various embodiments herein. Illustratively, computer 400 might be a device such as a wireless handset, smartphone, tablet, or portable computer, to name a few.

Computer 400 comprises a processor 410 operatively coupled to a data storage device 420 and a memory 430. Processor 410 controls the overall operation of computer 400 by executing computer program instructions that define such operations. Communications bus 460 facilitates the coupling and communication between the various components of computer 400. The computer program instructions may be stored in data storage device 420, or a non-transitory computer readable medium, and loaded into memory 430 when execution of the computer program instructions is desired.

Thus, the steps of the disclosed method (see, e.g., FIG. 3) and the associated discussion herein above can be defined by the computer program instructions stored in memory 430 and/or data storage device 420 and controlled by processor 410 executing the computer program instructions. For example, the computer program instructions can be implemented as computer executable code programmed by one skilled in the art to perform the illustrative operations defined by the disclosed method. Accordingly, by executing the computer program instructions, processor 410 executes an algorithm defined by the disclosed method. Computer 400 also includes one or more communications interface 450 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. Computer 400 also includes one or more input/output devices 440 that enable user interaction with computer 400 (e.g., camera, display, keyboard, mouse, speakers, microphone, buttons, etc.).

Processor 410 may include both general and special purpose microprocessors, and may be the sole processor or one of multiple processors of computer 400. Processor 410 may comprise one or more central processing units (CPUs), for example. Processor 410, data storage device 420, and/or memory 430 may include, be supplemented by, or incorporated in, one or more application-specific integrated circuits (ASICs) and/or one or more field programmable gate arrays (FPGAs).

Data storage device 420 and memory 430 each comprise a tangible non-transitory computer readable storage medium. Data storage device 420, and memory 430, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 440 may include peripherals, such as a camera, printer, scanner, display screen, etc. For example, input/output devices 440 may include a display device such as a cathode ray tube (CRT), plasma or liquid crystal display (LCD) monitor for displaying information to the user, a keyboard, and a pointing device such as a mouse or a trackball by which the user can provide input to computer 400.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A power controller for receiving source power from a power source, the power controller comprising:
   a processor; and
   a memory storing instructions that when executed cause the processor to perform operations comprising:
   determining when to provide the source power to a battery or a power buffer for charging the battery or for charging the power buffer, the battery having a first set of charging cycles and the power buffer having a second set of charging cycles, the second set of charging cycles being greater than the first set of charging cycles; and
   determining when to output power from the battery or output power from the power buffer for powering a power consuming body by predicting a likelihood of whether the power source will be substantially continuous or substantially intermittent, and based on the likelihood predicted of whether the power source will be substantially continuous or substantially intermittent and a type of the power source, determining when to provide the source power to the battery or the power buffer for charging the battery or for charging the power buffer.

2. The power controller of claim 1 wherein the power source is a sustainable voltage source.

3. The power controller of claim 1 wherein the power source is a variable voltage source.

4. The power controller of claim 1 wherein the power buffer is a high-capacity capacitor.

5. The power controller of claim 4 wherein the second set of charging cycles totals 500 cycles or greater.

6. The power controller of claim 1 wherein the battery is one of a lithium-ion battery, a nickel-metal hydride battery and a nickel-cadmium battery.

7. The power controller of claim 1 wherein the source power is provided substantially contemporaneously to the battery and the power buffer.

8. The power controller of claim 1 wherein the powering of the power consuming body is solely by the power buffer in accordance with the determining when to output power from the battery or output power from the power buffer.

9. The power controller of claim 1 further comprising:
a power input for receiving the source power from the power source, and wherein the power source is one of an electrical outlet, USB port, solar power, and ambient backscatter.

10. The power controller of claim 1 wherein the power consuming body is one of a portable electronic device, an automobile and an Internet-of Things (IoT) device.

11. A method for operating a power controller, the method comprising:
receiving source power from a power source;
predicting a likelihood of whether the power source will be substantially continuous or substantially intermittent;
determining, based on the likelihood predicted of whether the power source will be substantially continuous or substantially intermittent and a type of the power source, when to provide the source power to a battery or a power buffer for charging the battery or for charging the power buffer, the battery having a first set of charging cycles and the power buffer having a second set of charging cycles, the second set of charging cycles being greater than the first set of charging cycles; and
determining, based on the likelihood predicted of whether the power source will be substantially continuous or substantially intermittent and the type of the power source, when to output power from the battery or output power from the power buffer for powering a power consuming body.

12. The method of claim 11 further comprising:
outputting power to the power consuming body from the power buffer at a first interval; and
outputting power to the power consuming body from the battery at a second interval, wherein the first interval precedes the second interval.

13. The method of claim 11 wherein the source power is a sustainable voltage source.

14. The method of claim 11 wherein the source power is a variable voltage source.

15. The method of claim 14 wherein the charging of the battery or the power buffer occurs substantially contemporaneously.

16. The method of claim 11 wherein the power buffer is a high-capacity capacitor.

17. The method of claim 16 wherein the second set of charging cycles totals 500 cycles or greater.

18. The method of claim 11 wherein the battery is one of a lithium-ion battery, a nickel-metal hydride battery and a nickel-cadmium battery.

19. The method claim 11 wherein the power consuming body is one of a portable electronic device, an automobile and an Internet-of Things (IoT) device.

20. The method of claim 11 wherein the powering of the power consuming body is solely by the power buffer in accordance with the determining when to output power from the battery or output power from the power buffer.

* * * * *